United States Patent
Deng et al.

(10) Patent No.: US 9,533,611 B2
(45) Date of Patent: *Jan. 3, 2017

(54) VEHICLE ENTRY/EGRESS ASSISTANCE DEVICE

(71) Applicant: E. Mishan & Sons, Inc., New York, NY (US)

(72) Inventors: Daniel Deng, Dongguan (CN); Debbie Feuerstein, Riverdale, NY (US); Fred Hollinger, Monroe Township, NJ (US)

(73) Assignee: E. MISHAN & SONS, INC., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/163,802

(22) Filed: May 25, 2016

(65) Prior Publication Data

US 2016/0280110 A1    Sep. 29, 2016

Related U.S. Application Data

(63) Continuation of application No. 14/819,878, filed on Aug. 6, 2015, now Pat. No. 9,403,466, which is a continuation-in-part of application No. 29/534,989, filed on Aug. 3, 2015, now Pat. No. Des. 766,809, application No. 15/163,802, which is a continuation-in-part of application No. 29/526,110, filed on May 6, 2015, now Pat. No. Des. 762,158, and a continuation-in-part of application No. 29/517,992, filed on Feb. 19, 2015, now Pat. No. Des. 743,324.

(51) Int. Cl.
| | |
|---|---|
| *B60N 3/02* | (2006.01) |
| *B60R 22/32* | (2006.01) |
| *A62B 3/00* | (2006.01) |
| *F21V 21/40* | (2006.01) |
| *F21L 4/00* | (2006.01) |
| *F21V 23/04* | (2006.01) |
| *F21V 33/00* | (2006.01) |
| *F21Y 101/00* | (2016.01) |
| *F21Y 101/02* | (2006.01) |

(52) U.S. Cl.
CPC .............. *B60N 3/023* (2013.01); *A62B 3/005* (2013.01); *B60N 3/026* (2013.01); *B60R 22/32* (2013.01); *F21L 4/00* (2013.01); *F21V 21/406* (2013.01); *F21V 23/0428* (2013.01); *F21V 33/0064* (2013.01); *B60R 2022/328* (2013.01); *F21V 33/00* (2013.01); *F21Y 2101/00* (2013.01); *F21Y 2101/02* (2013.01); *F21Y 2115/10* (2016.08)

(58) Field of Classification Search
CPC .......... B60N 3/02; B60N 3/023; B60N 3/026; B60R 22/32
USPC ....... 296/1.02, 1.04; 16/110.1, 436; D12/400
See application file for complete search history.

*Primary Examiner* — Jason S Daniels
(74) *Attorney, Agent, or Firm* — Notaro, Michalos & Zaccaria P.C.

(57) ABSTRACT

An assistance device for entering and leaving a vehicle includes a handle member for supporting at least part of the weight of the user grasping a handle of the handle member, a striker pin insertion post for extending into the opening of a striker pin in the door frame, for supporting at least part of the weight of a user grasping the handle, and a pair of outrigger side portions extending transversely outwardly of the insertion post, on respective opposite sides of the handle member and insertion post, each having a transverse width greater than a transverse width of the insertion post for impeding entry of the insertion post into the opening of the striker pin when the handle member is outside the plane of the door frame.

27 Claims, 7 Drawing Sheets

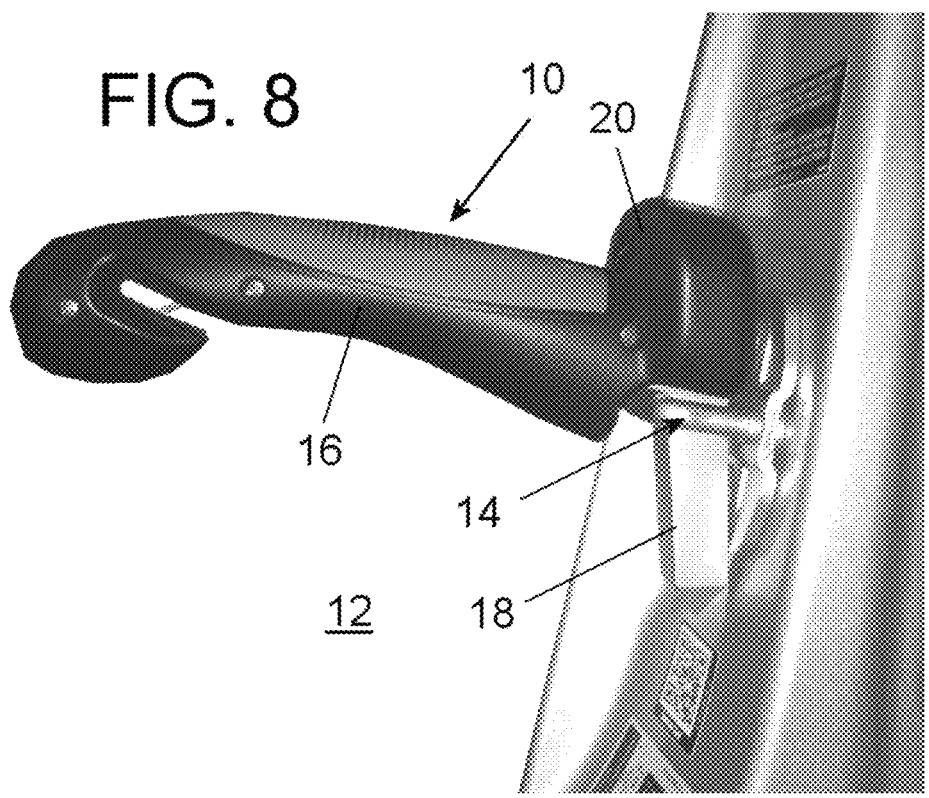

VEHICLE ENTRY/EGRESS ASSISTANCE DEVICE

CROSS REFERENCE TO RELATED APPLICATIONS

This is a continuation of U.S. patent application Ser. No. 14/819,878 filed Aug. 6, 2015, which is a continuation-in-part (CIP) of U.S. design patent application Ser. No. 29/517,992 filed Feb. 19, 2015, and also a continuation-in-part of U.S. design patent application Ser. No. 29/526,110 filed May 6, 2015, and also a continuation-in-part of U.S. design patent application Ser. No. 29/534,989, filed Aug. 3, 2015, all of which are incorporated herein by reference.

FIELD AND BACKGROUND OF THE INVENTION

The present invention relates generally to the field of aides for helping the elderly, disabled or infirmed and, in particular, to a new and useful assistance device for aiding a user to enter and leave a vehicle which has a door latch striker or striker pin with an opening, the latch striker or striker pin extending from a side of the door frame and within the plane of the door frame.

Devices for helping persons, in particular elderly, disabled or infirmed persons, such as those suffering from back, knee or hip pain or those recovering from surgery or an injury, to get into and out of a vehicle, in particular an automobile, are known.

British Patent Application GB 2 347 457 A to Davis for Aids for Use in Motor Vehicles, discloses an aid for use in facilitating exit from a motor vehicle that includes a first part which is shaped so that it can be fitted in a U-shaped door latch striker of a vehicle when the door is open, and a second part in the form of a handle which engages into the first part to project outwardly of the vehicle and be grasped manually to support a person getting out of the vehicle.

U.S. Pat. No. 6,340,189 to Pordy for a Universal Device for Facilitating Movement Into and Out of a Seat, discloses a device that facilitates egress and/or ingress of a passenger from a vehicle having a door opening with a post or pillar to one side of an individual's seat in the vehicle. This patent teaches extending an elongate handle of the device outwardly of the door opening so that it can be gripped by the passenger. A disadvantage of this arrangement is that the person, especially an elderly or infirmed person, must hold the outwardly extending handle in an awkward position as he or she turns to either sit in the seat when entering the vehicle, or when turning and rising to leave the vehicle.

U.S. Pat. No. 6,799,353 to Stewart teaches the same outward placement for a support handle for assisting individuals in exiting and entering motor vehicles.

A need remains for an improved device for aiding a user to enter and leave a vehicle in an ergonomic manner, especially since such devices are meant to be used by the elderly and/or the disabled and/or persons with joint pain or these recovering from surgery or an injury.

SUMMARY OF THE INVENTION

It is an object of the present invention to provide an assistance device for entering and leaving a vehicle that comprises a handle member for supporting at least part of the weight of a user grasping the handle or a handle member and pushing downwardly on it, a latch striker or striker pin insertion post for extending into and hooking the opening of a door latch striker or striker pin of a door frame of the vehicle, the door frame having a plane and an outrigger having a pair of side portions extending transversely outwardly of the insertion post, on respective opposite sides of the handle member and insertion post.

An object of the outrigger side portions is to impede insertion of the insertion post into the U-shaped opening of the latch striker or striker pin if the handle member is outside the plane of the door frame.

This establishes a more ergonomic position for the device and an improvement in the stability of the device as it is being grasped and downward pressure is being exerted to help the user rise from the vehicle seat and leave the vehicle, and conversely, as the user enters the vehicle door and sits in the vehicle seat.

Accordingly, a further object of the invention is to provide an improved assistance device for aiding a user to enter and leave a vehicle through a door frame of the vehicle, the door frame having a striker pin extending from a side of the door frame and being within a plane of the door frame at a location spaced from an exterior of the door frame, the striker pin having an opening, the device comprising a handle member of a size, shape and strength adapted to be grasped by the hand of a user, for supporting at least part of the weight of the user, a striker pin insertion post connected to an end or side of the handle member, the insertion post being of a size, shape and strength adapted to extend into the opening of the striker pin for supporting at least part of the weight of the user grasping the handle member, and an outrigger connected to the handle member and the insertion post and having opposite side portions extending transversely outwardly of the insertion post on respective opposite sides of the handle member and insertion post, each side portion having a transverse width that is greater than a transverse width of the insertion post, for impeding or hampering entry of the insertion post into the opening of the striker pin when the handle member is outside the plane of the door frame by more than a selected angle, and for restricting side-ways pivotal movement of the handle member to the selected angle when the insertion post extends into the opening of the striker pin.

The outriggers of the device prevent, impede or hamper rotation of the device out of the plane of the door to prevents impede or hamper insertion of the device from the wrong direction, due to the length of the outrigger. The outrigger extends on both sides of the device to be functional regardless of the side of the vehicle being accessed. Each wing or side of the outrigger has a length longer than the width of the insertion post, without extending begin the door frame. The outrigger rests on the top surfaces of the striker pin during proper use of the device and is pushed down to bear the weight force extended by the user. The insertion post preferably has a surface which is designed to prevent scratches of the door frame. For example the post, that is preferably make of aluminum or other metal or hard polymer, may have a rubberized or plastic outer surface treatment, e.g. by being spray coated, dipped or painted with elastomeric material.

The invention can be embodied has a straight or a round design, but each may be gripped with two hands, e.g. along the length of the straight embodiment, or on the upper and lower parts of the round design.

LEDs on the device helps the user find the vehicle key hole to unlock the vehicle, and/or to help locate the striker pin in the dark and/or as a general purpose flashlight.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 8 is a side view of the assistance device of FIG. 1, engaged to the striker pin on the door frame of a vehicle as it is to be used according to the invention;

DESCRIPTION OF THE PREFERRED EMBODIMENTS

Figure 2:
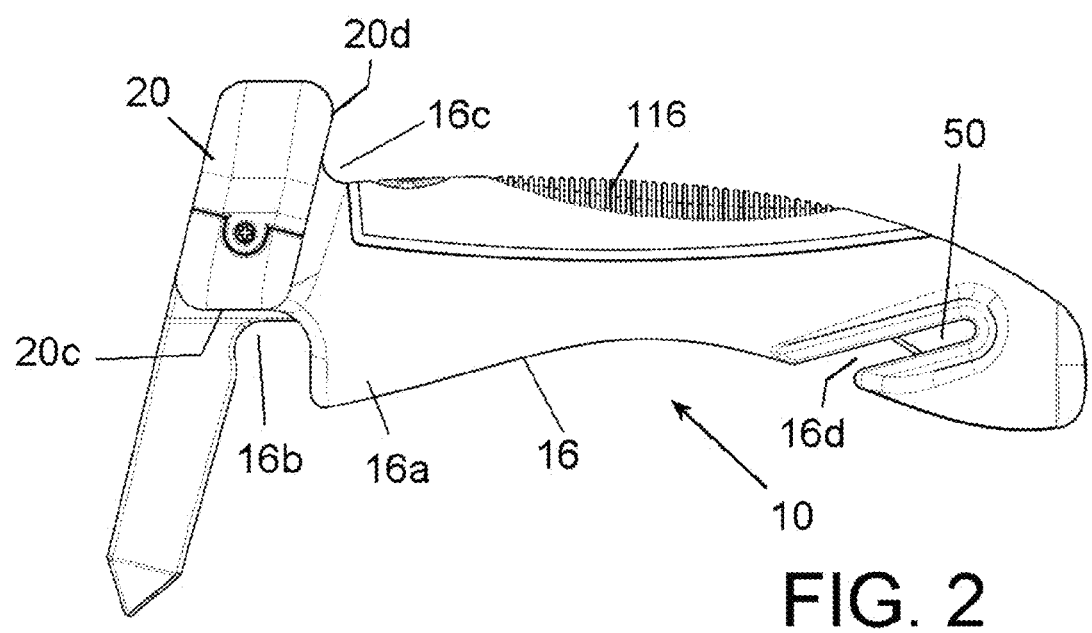
FIG. 2 is a side elevational view of the assistance device.
Figure 3:
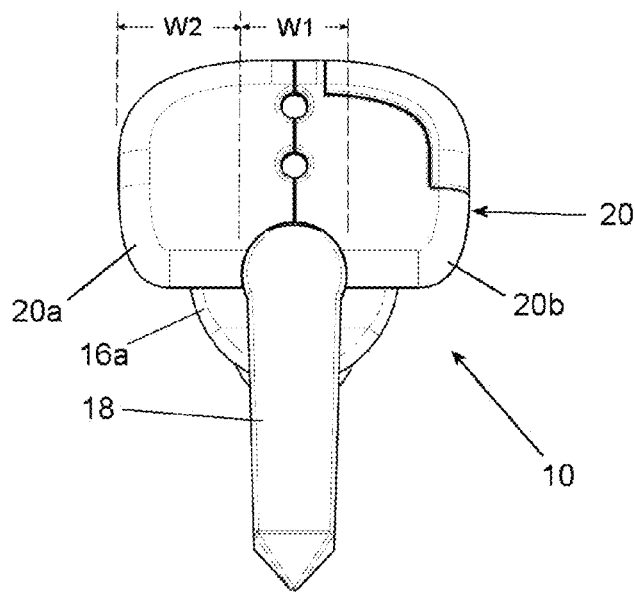
FIG. 3 is a front elevational view of the assistance device.
Figure 4:
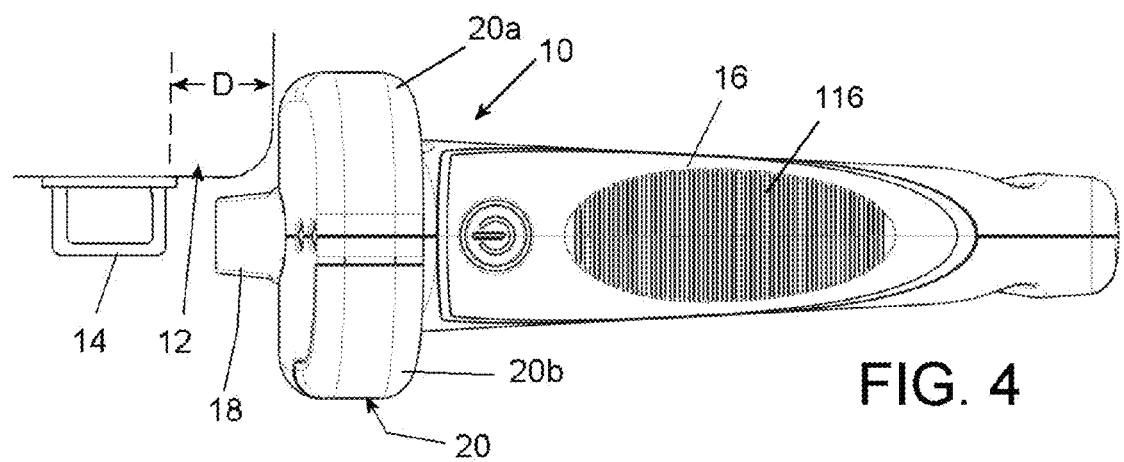
FIG. 4 is a top plan view of the assistance device with parts of a vehicle door frame to show an interaction of the invention with the door frame.

Referring now to the drawings, in which like reference numerals are used to refer to the same or similar elements, FIGS. 1 to 4 and 8 show an assistance device 10 for aiding a user such as an elderly person and/or the disabled and/or persons with joint (e.g. knee, back or hip) pain or these recovering from surgery or an injury, or who are otherwise infirmed, to enter or leave a motor vehicle such as an automobile, through a door frame 12 of the vehicle, the door frame having a door latch striker or striker pin 14, usually a U-shaped design, with an opening therein. The striker pin or latch striker 14 extends from a side of the door frame and is within the plane of the door frame 12, at a location spaced by a distance D from an exterior of the door frame as shown in FIG. 4.

The assistance device 10, includes a handle member 16 with a soft elastomeric grip area cover 116, the handle being of a size, shape and strength adapted to be grasped by one or both hands of a user, for supporting the weight of the user, as he or she pushes down on the device to enter or leave the vehicle. A striker pin insertion post 18 is connected to an end of the handle member 16, and is of a size, shape and strength adapted to extend into the opening of the striker pin 14 and hook onto the striker pin, so that the device rests on the striker pin 14, for supporting the weight of a user grasping the handle member, to lean down on the striker pin, as he or she enters of leaves the vehicle through the door frame 12. The grip area cover 116, that is proved at an intermediate location along the handle member 16, acts as the handle of the device, in insure that user grasps the device in an optimum manner. The handle member is long enough to allow the user to also use his or her other hand also grasp the device if they wish, to further aide them to exert downward pressure on the striker latch 14, to help them rise from the vehicle seat to leave the vehicle, or to gently sit in the seat while entering the vehicle.

In accordance with at least one advantageous feature of the invention, an outrigger 20 is connected to the handle member 16 and the insertion post 18. As best shown in FIGS. 3 and 4, the outrigger 20 has opposite side portions 20a and 20b that extend transversely outwardly of the handle member and the insertion post on respective opposite sides of the handle member and insertion post. The outrigger 20 also extends upwardly of the handle member and post as best shown in FIG. 2.

As best shown in FIG. 3, each side portion 20a and 20b, has a transverse width W2 beyond the post 18, that is greater than a transverse width W1 of the insertion post itself. As shown in FIG. 4, this prevents or impedes entry of the insertion post 18 into the opening of the striker pin 14 when the handle member approaches the striker pin from outside the vehicle, because one of the side portions 20a or 20b (depending on which side of the vehicle is approached) will contact the side of the vehicle, outside the door frame, before the insertion post 18 reaches the striker pin 14, due to its spacing D from the outside of the vehicle.

This insures that the user will use the assistance device 10 of the invention to insert the insertion post 18 into the striker pin 14 only when the handle member 16 extends generally and mostly in the plane of the door frame as shown in FIGS. 4 and 8. As shown in FIGS. 4 and 8, the outrigger 20 impedes entry of the insertion post 18 into the opening of the striker pin 14, when the handle member is outside the plane of the door frame.

The outrigger 20 also restricts the amount of side way pivotal movement the handle member 16 can make when the insertion post 18 extends into the opening of the striker pin 14. In this way, the elderly, disabled or infirmed user feels more secure grasping and pressing down of the device of the invention to assist in rising from the vehicle seat and leaving the vehicle and while entering the door frame to sit in the vehicle seat.

Figure 1:
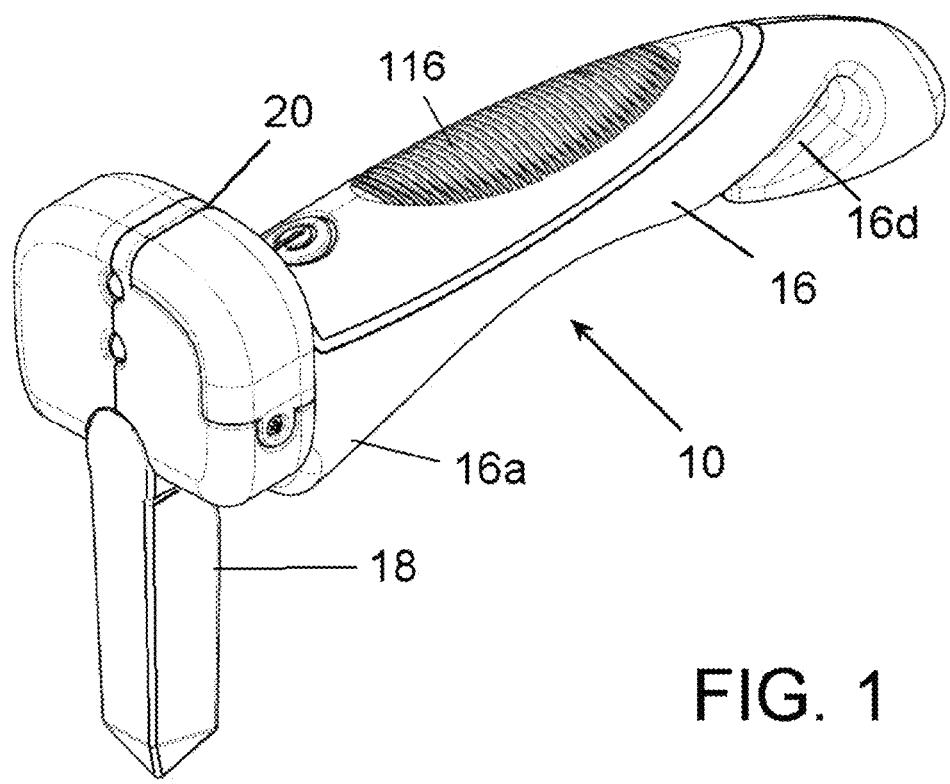
FIG. 1 is a front, top, left perspective view of an assistance device according to the invention.

The outrigger 20 has a front surface opposite the handle member 16 that extends across the front of each side portion 20a, 20b, and is generally co-planar with the flat front surface of the generally quadrangular insertion pin 18 as shown in FIGS. 1, 2 and 4. The outrigger 20 also has a rear surface 20d facing the handle member 16 that extends across the rear of each side portion 20a, 20b. Each side portion has a downwardly facing lower surface 20c next to an adjacent side of the insertion post 18. The rear surface 20d extends upwardly and to the sides of the handle member 16 to define a recess 16c in the handle member and to form a hand guard for the user, against the user's hand accidently sliding too far forward on the handle and toward the side of the door frame where it may get caught or pinched between the device and the door frame. This hand guard is further delineated by the upper recess 16c at the upper front end of the handle member 16, and a lower recess 16b at the lower front end of the handle member 16 as shown in FIG. 2.

To further resist sliding of the user's hand toward the insertion post end of the device, the handle member also has a lower enlargement 16*a* near the insertion post for increasing security of a user's grip on the handle member.

To further enhance the utility of the assistance device of the invention and as shown in FIGS. 1 to 4, the device includes at least one but preferably two LEDs on the front surface of the outrigger 20, for illuminating the striker pin 14 and the corresponding side of the door frame 12. To even further enhance the usefulness of the device and as shown in the exploded view of FIG. 5, the device also includes at least one LED in each lower surface 20*c* of outrigger 20, for casting light downwardly.

To still further enhance the utility of the assistance device, handle member 16 includes a slit or slot 16*d* spaced away from the insertion post 18 and a cutting blade 50 in the slot for cutting a vehicle safety belt during an emergency.

Figure 5:
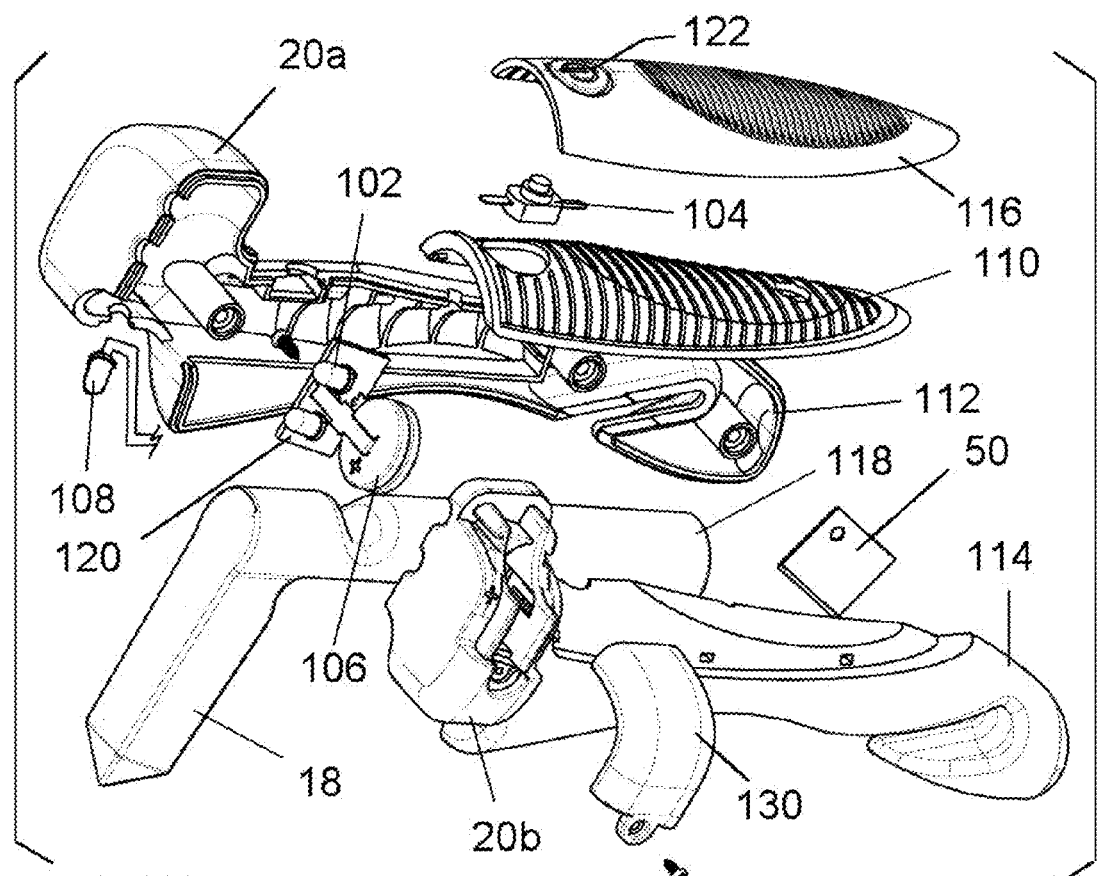
FIG. 5 is an exploded view of the assistance device.

FIG. 5 illustrates the internal arrangement of the assistance device 10. The insertion post 18 is an integral part of an L-shaped metal core piece 118 that is made of aluminum, steel or another hardened material, and that includes a cylindrical piece encased between plastic housing halves 112 and 114 that form the handle member and outrigger. Plastic housing halves 112 and 114 contain reinforcing ribs and voids for securely immobilizing the core 118 therein when the halves are mated to each other and connected to each other by screws or other means. Cutting blade 50 is also immobilized between the housing halves 112 and 114, e.g. by one of the screws, and with its cutting edge in the handle member slot 16*d* as shown in FIG. 2.

A forward part of each of housing halves 112, 114, is enlarged to form the respective opposite side portions 20*a* and 20*b* of the outrigger. Side portion 20*b* includes and opening that is closed by a battery compartment cover door 130 held over a battery compartment in portion 20*b*, by a screw. The interior of side portion 20*b* is shaped to form a battery compartment for a button battery 106 that is inserted before door 130 is closed over the compartment. Battery 106 is held between electrical contacts of an LED circuit board 120 that also carries a pair of forward facing LEDs 102. One of the two additional down-facing LEDs 108 is connected by wires to the circuit board 120. A push button switch 104 is also connected by wires to the circuit board 120 for turning the LEDs on and off.

Appropriate internal voids and structures are also formed in housing halves 112, 114 to securely support and position the LEDs, switch and circuit board, when the halves are mated and connected to each other.

A curved grip area foundation piece 110 of plastic is also provided for being attached, e.g. by adhesive, to the top gripping area of the handle member portion of the mated together halves 112, 114. Foundation piece 110 includes shallow transverse ribs for improving a grip on the handle member, and an opening for access to the button actuator of switch 104. A rubber or other soft elastomeric grip area cover 116 including a push button area 122 is adhered over the foundation piece 110. Cover 116 includes spaced, flexible, transverse ribs to further enhance the user's grip on the device. Push button area 122 is an integral part of the rest of the cover 116, and is separated from the rest of the cover by a thin ring to allow easier pushing of the area 122 to activate the switch 104 below, while at the same time maintaining a water tight seal over the mated housing halves 112 and 114.

Cover 116 forms the handle area of the device to encourage proper use do the device on the strong hand of the user. The user may also use his or her other hand to also grasps the handle member 16 for added security.

In all embodiments of the invention, the insertion post 18 may be coated, dipped or painted with softer material like latex rubber or the like, to prevent scratching any part of the vehicle while being used. Although the invention operates without softening the outer surface of the insertion post, the purpose of using a plastic insertion post or rubberizing or coating the post, is to avoid scratching the paint of a car or other vehicle door frame in case the post is not properly inserted into the striker pin or if the user misses the striker pin.

Figure 6:
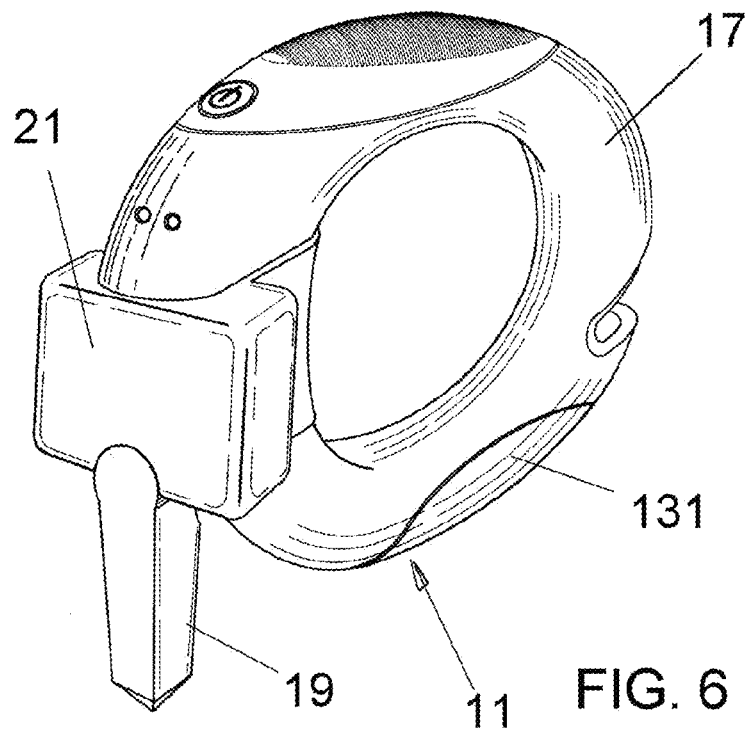
FIG. 6 is a front, top, left perspective view of another embodiment of the assistance device according to the invention.
Figure 7:
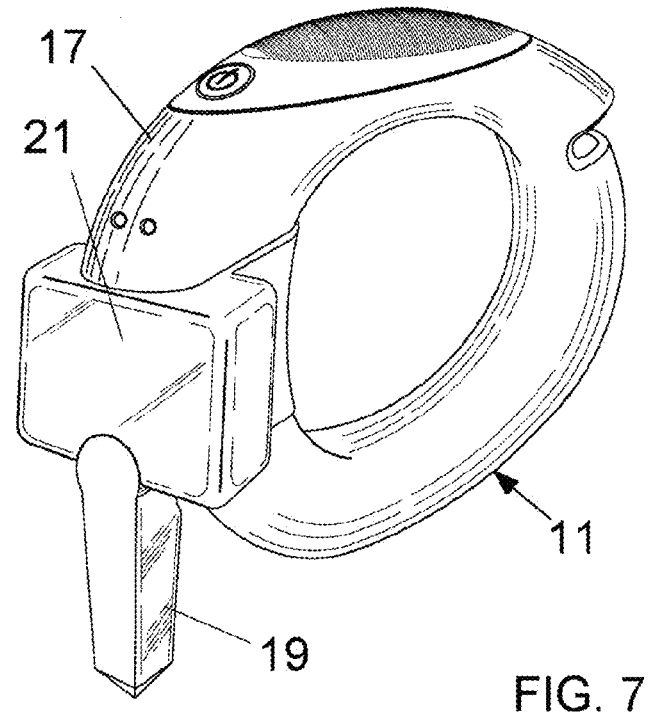
FIG. 7 is a front, top, left perspective view of a still further embodiment of the assistance device according to the invention.

In the embodiments of FIGS. 6 and 7, assistance device 11 of the invention has a handle member 17 in the shape of a hoop or closed loop used in a generally vertical plane and having a gripping area, for example, an upper gripping surface. As with the embodiment of FIGS. 1 to 5, the assistance device 11 includes handle member 17 for supporting at least part of the weight of the user grasping the handle member, a striker pin insertion post 19 for extending into the opening of a striker pin in the door frame, also for supporting at least part of the weight of a user grasping the handle defined at the cover 116 of the handle member 16, and an outrigger 21 with a pair of side portions extending transversely outwardly of the handle member and the insertion post, on respective opposite sides of the handle member and insertion post, each having a transverse width greater than a transverse width of the insertion post for hampering or impeding entry of the insertion post into the opening of the striker pin when the handle member is outside the plane of the door frame by more than a selected angle and for restricting side-ways pivotal movement of the handle member to the selected angle.

Forward and downward LEDs are also provided, as well as a safety belt cutter opposite the insertion post, and either near the top of the hoop shaped handle 17 as in FIG. 7, or near the bottom as in FIG. 6.

Since extra space is available in the bottom portion of the handle member 17, a larger and greater capacity AAA or AA battery can be used to power LEDs of the embodiments of FIGS. 6 and 7, the battery being behind a battery compartment door 131 in the lower portion of the hoop shaped handle in FIG. 6. In the embodiment of FIG. 7 a battery compartment door may be in the same location as in FIG. 6, or it may be on one of the outrigger side portions as in the embodiment of FIGS. 1 to 5.

As with the embodiment of FIGS. 1-5, two hands can be used by the user to grasp the handle member in the embodiment of FIGS. 6 and 7, by holding the upper part of the ring shaped or round handle member with one hand, and by slipping the other hand into the opening of the handle member and grasping the lower part of the handle member with the other hand.

Figure 9A:
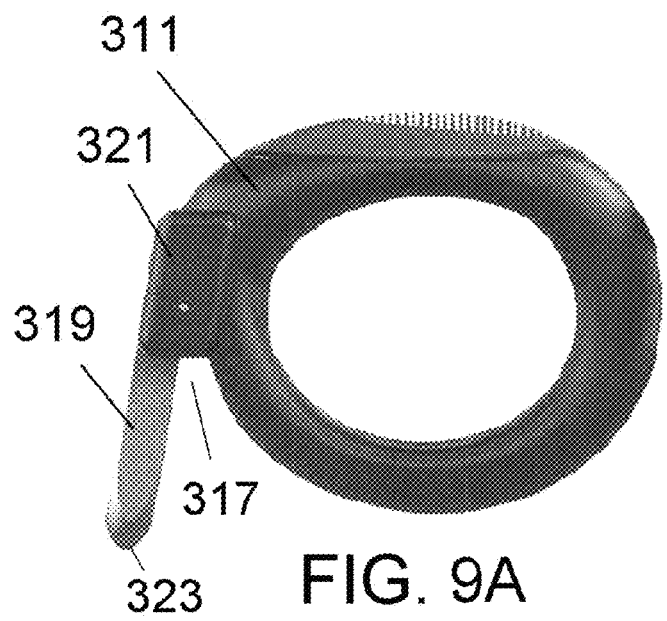
FIG. 9A is a side elevational view of another embodiment of the assistance device according to the invention.
Figure 9B:
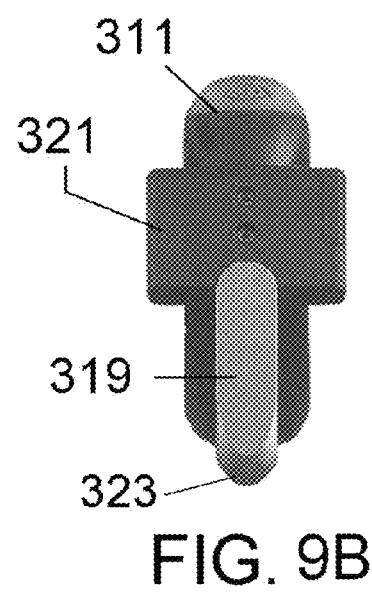
FIG. 9B is a front elevational view of the embodiment of FIG. 9A.
Figure 10A:
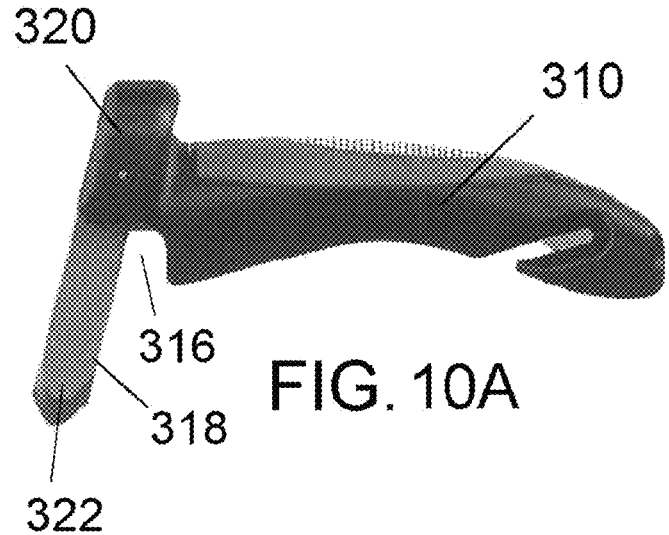
FIG. 10A is a side elevational view of still another embodiment of the assistance device according to the invention.
Figure 10B:
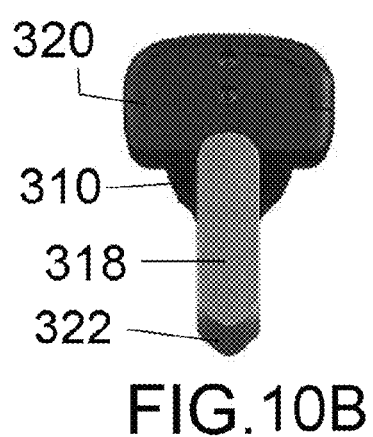
FIG. 10B is a front elevational view of the embodiment of FIG. 10A.

In two further embodiments of FIGS. 9A, 9B, 10A and 10B, assistance devices 310 and 311 of the invention have handle members either in the shape of a hoop, ring or round shape in FIGS. 9A and 9B or being straight in FIGS. 10A and 10B and having a gripping area spaced from a striker pin insertion post 318 in the case of FIGS. 10A and 10B or 319 in the case of FIGS. 9A and 9B. In both embodiments the insertion posts 318 and 319, which are not tapered, extend into the opening of a striker pin or latch striker in a vehicle door frame. The insertion posts opposite flat smooth surfaces that terminate in a rounded conical or bullet shaped lower end. The smooth surfaces extend to the top of their exposed lengths at the respective outrigger 320 and 321. A portion of the latch striker or striker pin will extend into the recess 316 or 317 of these embodiments.

Each post 318 and 318 has a blunt rounded end 322 and 323 that can be used to break a vehicle window in an emergency, but is otherwise not sharp.

The smooth, featureless and flat surfaces of each post 318 and 319, allow easy insertion, use and then removal of the insertion posts 318 and 319 into and out of a vehicle striker pin, with no locking, engagement or securement of the device to the striker pin, that may cause the infirmed or elderly user difficulty extracting the insertion pin. Despite this lack of locking, engagement or securement of the insertion pin, once inserted, the user can push firmly down on the handle without fear that it will be dislodged from the striker pin.

Figure 11:
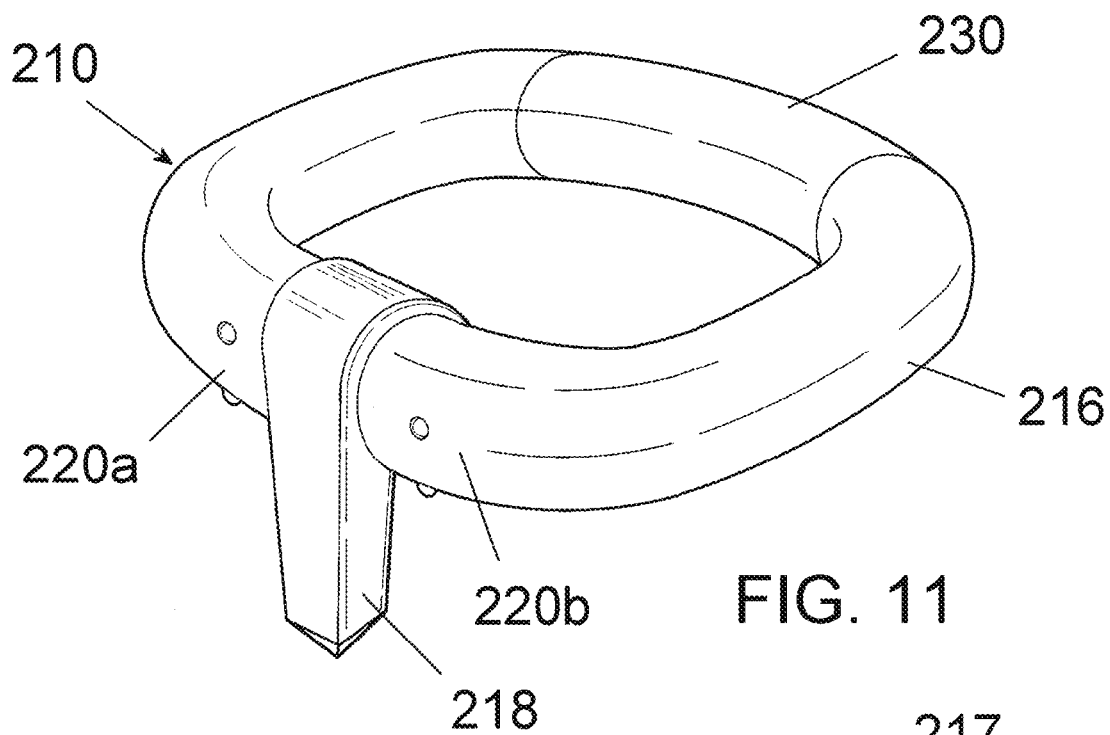
FIG. 11 is a front, top, left perspective view of another embodiment of the assistance device according to the invention.
Figure 12:
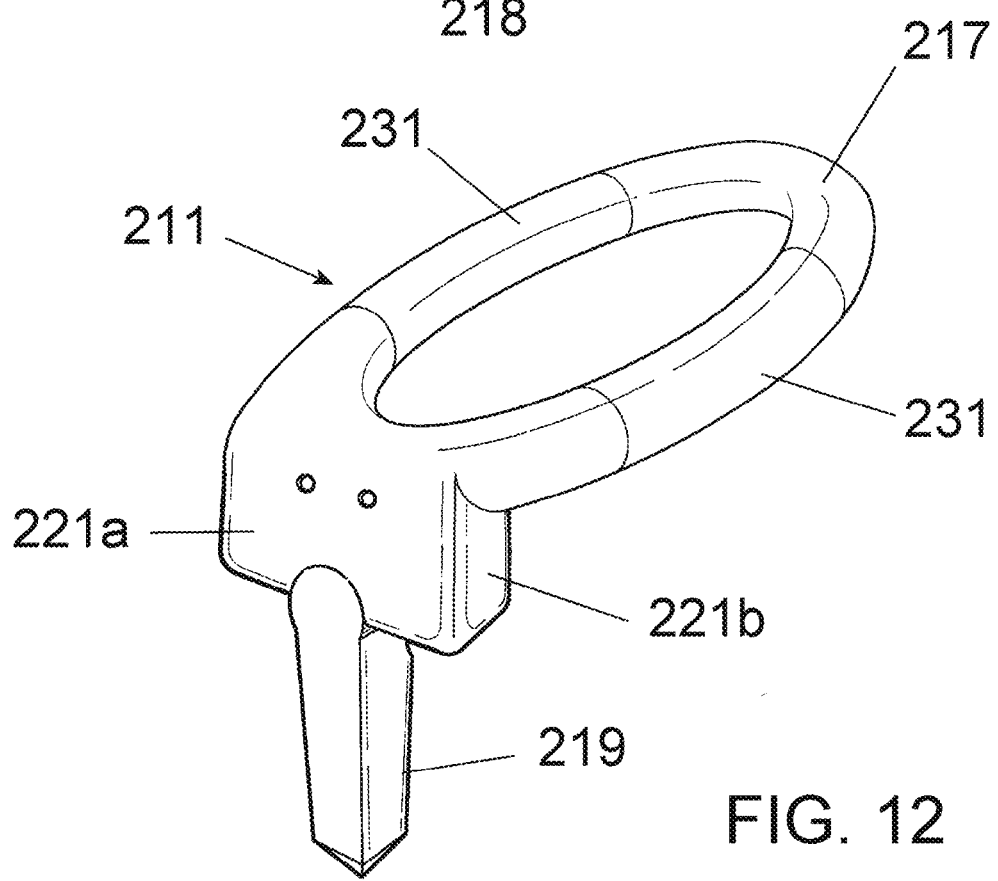
FIG. 12 is a front, top, left perspective view of a still other embodiment of the assistance device according to the invention.

In the embodiments of FIGS. 11 and 12, assistance devices 210 and 211 of the invention have handle members 216 and 217 in the shape of a hoop or closed loop used in a generally horizontal plane and having either one gripping area 230 spaced from a striker pin insertion post 218 in the case of FIG. 11, or two gripping areas 231 on opposite sides of a striker pin insertion post 219 in FIG. 12. In both embodiments the insertion posts 218 and 219 are for extending into the opening of a striker pin in a vehicle door frame.

As with the embodiment of FIGS. 1 to 5, the assistance devices 210 and 211, the handle members are for supporting at least part of the weight of the user grasping the handle or the handle member, the striker pin insertion post 218 and 219 for extending into the opening of a striker pin in the door frame, also for supporting at least part of the weight of a user grasping the handle of the handle member. In these embodiments as well, an outrigger is provided, this time made up of outrigger side portions 220a and 220b in FIG. 11, extending transversely outwardly of the insertion post 218, on respective opposite sides of the insertion post, but being formed as part of the handle member 216. As with the other embodiments of the invention each side portion has a transverse width greater than a transverse width of the insertion post for hampering or impeding entry of the insertion post into the opening of the striker pin when the handle member is outside the plane of the door frame by more than a selected angle and for restricting side-ways pivotal movement of the handle member to the selected angle.

In the embodiment of FIG. 12, an outrigger is also provided as in FIG. 11, made up of outrigger side portions 221a and 221b in FIG. 12, extending transversely outwardly of the insertion post 219, on respective opposite sides of the insertion post, and being formed as part of the handle member 217.

Forward and downward LEDs are also provided in the side portions of FIGS. 11 and 12.

As with the embodiments of FIGS. 6 and 7, extra space is available in the bottom portion of the handle members 216 and 217 for a larger and greater capacity AAA or AA battery can be used to power the LEDs of these embodiments.

While specific embodiments of the invention have been shown and described in detail to illustrate the application of the principles of the invention, it will be understood that the invention may be embodied otherwise without departing from such principles.

What is claimed is:

1. An assistance device (10, 11, 210, 211) for aiding a user to enter and leave a vehicle through a door frame (12) of the vehicle, the door frame having a striker pin (14) extending from a side of the door frame and being within a plane of the door frame at a location spaced from an exterior of the door frame, the striker pin having an opening, the device comprising:

a handle member (16, 17, 216, 217) of a size, shape and strength adapted to be grasped by the hand of the user, for supporting at least part of the weight of the user;

a striker pin insertion post (18, 19, 218, 219) connected to the handle member, the insertion post being of a size, shape and strength adapted to extend into the opening of the striker pin for supporting at least part of the weight of the user grasping the handle member; and an outrigger (20, 21, 220a/b, 221a/b) connected to the handle member and the insertion post, the outrigger having opposite side portions extending transversely outwardly of the insertion post on respective opposite sides of the handle member and insertion post, each side portion having a transverse width (W2) beyond the insertion post, that is greater than a maximum transverse width (W1) of the insertion post, for impeding entry of the insertion post into the opening of the striker pin when the handle member is outside the plane of the door frame and for restricting side-ways pivotal movement of the handle member when the insertion post extends into the opening of the striker pin.

2. The assistance device according to claim 1, wherein the outrigger has a rear surface facing the handle member that extends across a rear of each side portion, the rear surface extending to the sides of the handle member to define a hand guard for the user.

3. The assistance device according to claim 1, wherein the outrigger has a front surface opposite the handle member that extends across a front of each side portion and a rear surface facing the handle member that extends across a rear of each side portion, each side portion having a downwardly facing lower surface next to an adjacent side of the insertion post, the rear surface extending upwardly and to the sides of the handle member to define a hand guard for the user, the device including at least one LED on the front surface for illuminating the striker pin and the side of the door frame.

4. The assistance device according to claim 1, wherein the handle member has a lower enlargement near the insertion post for increasing security of the user's grip on the handle member, and a recess between the enlargement and an upper end of the insertion post for improving insertion of the insertion post into the striker pin opening.

5. The assistance device according to claim 1, wherein the handle member has a lower enlargement near the insertion post for increasing security of the user's grip on the handle member, and a recess between the enlargement and an upper end of the insertion post for improving insertion of the insertion post into the striker pin opening, the outrigger having a front surface opposite the handle member that extends across a front of each side portion and a rear surface facing the handle member that extends across a rear of each side portion, each side portion having a downwardly facing lower surface next to an adjacent side of the insertion post, the rear surface extending upwardly and to the sides of the handle member to define a hand guard for the user.

6. The assistance device according to claim 1, wherein the handle member includes a slot and a cutting blade in the slot for cutting a vehicle safety belt during an emergency.

7. The assistance device according to claim 1, wherein the handle member is in the shape of a closed loop having a gripping area.

8. The assistance device according to claim 1, wherein the handle member is straight and has an axis with at least one LED light mounted in the device for casting light substantially parallel to the axis.

9. The assistance device according to claim 1, including at least one LED and wherein the handle member is in the shape of a hoop having an upper gripping surface and a lower portion, the lower portion including a battery compartment for a battery for powering the LED and a battery compartment door covering the battery compartment.

10. The assistance device according to claim 1, wherein a front surface of the insertion post is substantially aligned with a front surface of the outrigger.

11. The assistance device according to claim 1, wherein the insertion post is made of or is coated with a material that is soft so as not to scratch any part of a vehicle with which the device is used.

12. An assistance device for entering and leaving a vehicle comprising:
  a handle member for supporting at least part of the weight of a user grasping the handle member;
  a striker pin insertion post connected to an end of the handle member for extending into an opening of a striker pin in a door frame of the vehicle, the door frame having a plane and the insertion post also for supporting at least part of the weight of the user grasping the handle member;
  an outrigger extending transversely outwardly of the insertion post, on respective opposite sides of the handle member and insertion post, of a sufficient size to impede entry of the insertion post into the opening of the striker pin when the end of the handle member is outside the plane of the door frame.

13. The assistance device of claim 12, wherein the outrigger has a rear surface facing the handle member, the rear surface extending upwardly and to the sides of the handle member to define a hand guard for the user.

14. The assistance device of claim 12, wherein the outrigger has a pair of opposite side portions and a front surface opposite the handle member that extends across a front of each side portion and a rear surface facing the handle member that extends across a rear of each side portion, each side portion having a downwardly facing lower surface next to an adjacent side of the insertion post, the rear surface extending upwardly and to the sides of the handle member to define a hand guard for the user, the device including at least one LED for illuminating the striker pin and the side of the door frame.

15. The assistance device of claim 12, wherein the outrigger has a rear surface facing the handle member, the rear surface extending upwardly and to the sides of the handle member to define a hand guard for the user, the handle member being straight and having an axis, the device including at least one LED for casting light parallel to the axis.

16. The assistance device of claim 12, wherein the handle member has a lower enlargement near the insertion post for increasing security of the user's grip on the handle member, and a recess between the enlargement and an upper end of the insertion post for improving insertion of the insertion post into the striker pin opening.

17. The assistance device of claim 12, wherein the handle member has a lower enlargement near the insertion post for increasing security of the user's grip on the handle member, and a recess between the enlargement and an upper end of the insertion post for improving insertion of the insertion post into the striker pin opening, the outrigger having a front surface opposite the handle member that extends across a front of each side portion and a rear surface facing the handle member that extends across a rear of each side portion, each side portion having a downwardly facing lower surface next to an adjacent side of the insertion post, a rear surface extending upwardly and to the sides of the handle member to define a hand guard for the user.

18. The assistance device of claim 12, wherein handle member includes a slot and a cutting blade in the slot for cutting a vehicle safety belt during an emergency.

19. The assistance device of claim 12, wherein the handle member is in the shape of a hoop having an upper gripping surface.

20. The assistance device of claim 12, including an LED and wherein the handle member is in the shape of a hoop having an upper gripping surface and a lower portion, the lower portion including a battery compartment for a battery for powering the LED and a battery compartment door covering the battery compartment.

21. The assistance device of claim 12, wherein the outrigger has opposite side portions extending transversely outwardly of the handle member.

22. An assistance device for entering and leaving a vehicle comprising:
  a handle member for supporting at least part of the weight of a user grasping the handle member;
  a striker pin insertion post connected to an end of the handle member for extending into an opening of a striker pin in a door frame of the vehicle; and
  an enlarged area between the handle member and striker pin insertion post, extending transversely outwardly of the insertion post, on respective opposite sides of the handle member and the insertion post of a sufficient size to impede entry of the insertion post into the opening of the striker pin when the end of the handle member is outside the plane of the door frame.

23. The assistance device of claim 22, wherein the enlarged area has a rear surface facing the handle member, the rear surface extending upwardly and to the sides of the handle member to define a hand guard for the user.

24. The assistance device of claim 22, wherein the enlarged area has a pair of opposite side portions and a front surface opposite the handle member that extends across a front of each side portion and a rear surface facing the handle member that extends across a rear of each side portion, each side portion having a downwardly facing lower surface next to an adjacent side of the insertion post, the rear surface extending upwardly and to the sides of the handle member to define a hand guard for the user, the device including at least one LED for casting light parallel to an axis of the handle member.

25. The assistance device of claim 22, wherein the handle member is straight and has an axis, the device including at least one LED for casting light parallel to the axis.

26. The assistance device of claim 22, wherein the handle member has a lower enlargement near the insertion post for increasing security of the user's grip on the handle member, and a recess between the enlargement and an upper end of the insertion post for improving insertion of the insertion post into the striker pin opening.

27. The assistance device of claim 22, wherein the handle member has a lower enlargement near the insertion post for increasing security of the user's grip on the handle member, and a recess between the enlargement and an upper end of the insertion post for improving insertion of the insertion post into the striker pin opening, the enlarged area having front and rear surfaces extending outwardly of the handle member, the handle member being straight and having an axis, the device including a plurality of LEDs for casting light parallel to the axis.

* * * * *